(12) United States Patent
Steinmann

(10) Patent No.: US 6,302,066 B1
(45) Date of Patent: Oct. 16, 2001

(54) APPARATUS AND METHOD OF COOLING A WORK MACHINE

(75) Inventor: Jeff A. Steinmann, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/512,533

(22) Filed: Feb. 24, 2000

Related U.S. Application Data

(60) Provisional application No. 60/132,116, filed on Apr. 30, 1999.

(51) Int. Cl.$^7$ .................................................. F01P 7/10
(52) U.S. Cl. ...................... 123/41.49; 123/51; 416/175; 415/98
(58) Field of Search ................... 123/41.49; 165/41, 165/51; 416/175, 203; 415/98, 101, 102

(56) References Cited

U.S. PATENT DOCUMENTS

| | | |
|---|---|---|
| 2,668,523 | 2/1954 | Lamb ..................... 123/41.49 |
| 4,184,541 | 1/1980 | Beck et al. . |
| 4,213,426 | 7/1980 | Longhouse . |
| 4,357,914 | 11/1982 | Hauser . |
| 4,396,351 | 8/1983 | Hayashi et al. . |
| 4,566,852 | 1/1986 | Hauser . |
| 5,131,352 | 7/1992 | Hoshino et al. . |
| 5,183,382 | 2/1993 | Carroll . |
| 5,590,624 * | 1/1997 | Emond et al. ..................... 123/41.49 |
| 5,689,953 * | 11/1997 | Yamashita et al. ..................... 60/316 |
| 5,709,175 | 1/1998 | Carroll . |
| 5,839,397 * | 11/1998 | Funabashi et al. ............... 123/41.01 |

FOREIGN PATENT DOCUMENTS

| | | |
|---|---|---|
| 3737391 A1 | 5/1989 | (DE) . |
| 0 445 804 A1 | 9/1991 | (EP) . |
| WO 91/06779 | 5/1991 | (WO) . |

\* cited by examiner

*Primary Examiner*—Tony M. Argenbright
*Assistant Examiner*—Katrina B. Harris
(74) *Attorney, Agent, or Firm*—Byron G. Buck; Liza J. Meyers

(57) ABSTRACT

An apparatus and method of cooling a work machine is disclosed. A work machine includes a frame, a plurality of ground engaging devices, an operator compartment, a work implement, an engine, and a cooling system. The cooling system includes a radiator, a rotating fan assembly, a rotating deflector, and a means for rotating the fan and the deflector. The rotating fan assembly includes a fan and is for drawing air in a first direction across the radiator. The deflector has a concave surface with a plurality of projections extending therefrom and adapted to draw air in a second direction as the deflector is rotated.

28 Claims, 3 Drawing Sheets

APPARATUS AND METHOD OF COOLING A WORK MACHINE

This application claims the benefit of prior provisional patent application Ser. No. 60/132,116 filed Apr. 30, 1999.

TECHNICAL FIELD

This invention relates generally to an apparatus and method of cooling a work machine and, more particularly, to an apparatus and method that cools an internal combustion system, suppresses sound, and draws air from a plurality of directions.

BACKGROUND ART

Work machines having an attached implement, such as motor graders, excavators, mining shovels, back hoe loaders, wheel loaders, track type tractors, wheeled tractors, compactors, track type loaders, and the like are used for moving earth. Such implements may include buckets, blades, impact rock rippers, and other material handling apparatus. Typically, work machines may be configured to perform various work cycles. For example, a track type loader typically has a bucket used to dig, collect (rack) a load, carry a load, and/or dump a load.

Generally, a work machine has a frame and an implement having a linkage operably connecting the implement to the frame. Typically, as the work machine performs various work cycles, various portions of the implement and linkage are operated and the work machine is propelled across the grade. Such work cycles may include digging, loading, racking, lifting, carrying, dumping, and lowering a load. Most of these functions provide a load on the engine, thereby increasing the amount of heat generated by the internal combustion system.

Internal combustion engines and associated cooling air systems tend to be relatively noisy. Governmental bodies in many countries are continuously striving to require engine and vehicle manufacturers to reduce the noise output of their products. The manufacturers themselves also desire to reduce the noise level in order to provide operators and bi-standers with a more comfortable atmosphere.

In such an endeavor, a multiplicity of schemes and constructions have been tried, some of which make significant progress in noise reduction. It is also understood in the industry that the variables in noise reduction are many and exist in many combinations. Therefore, seemingly insignificant modifications in air flow systems sometimes represent dramatic improvements in noise reduction.

Noise reduction of engine cooling air systems has been achieved in some instances by insulating the area in relatively close proximity to the fan with a sound absorbing material. This approach achieves a reduction in the noise level of the cooling air system, however, the insulation tends to retain heat which reduces the efficiency of the cooling system associated with the internal combustion engine. Further, the increased heat can degrade other insulating materials within the engine enclosure, particularly those used in electrical and electronic systems commonly utilized on today's work machines. This heat can also affect components such as alternators, starters, belts, engine mounts, dampers, microprocessors, transistors, capacitors, and resistors.

Vehicle engine noise can be effectively attenuated by ducted enclosures which provide limited air flow access via controlled, indirect, acoustically lined paths (ducts). However, with current cooling systems, increased air restriction requires higher fan speeds to deliver adequate cooling air flow. Higher fan speeds generate high fan noise which results in an unacceptably loud vehicle. Additionally, the use of ducts allows the noise generated by the engine to escape out through the ducts. Therefore, it is desirable to minimize the number of ducts and to pay particular attention to the geometry or routing of the ducts.

Other prior attempts to reduce the noise level of cooling air flow systems have been related to axial fan geometry, including blade and shroud design. These attempts have only been marginally successful as they have not reduced the amount of noise emitted to a target sound level.

It is known from U.S. Pat. No. 5,183,382 to Carroll and granted on Feb. 2, 1993 to use a rotating fan and shroud assembly to reduce noise emitted therefrom and increase cooling system efficiency. The '382 patent teaches using the rotating fan and shroud assembly in combination with a labyrinth-type seal to improve the serviceability and reduce maintenance time and cost. The '382 patent teaches the positioning of a first end of an inlet bell-mouth portion of the shroud assembly between a pair of flexible members which allows ease of servicing and prevents recirculation of cooling air.

Further, it is known from U.S. Pat. No. 5,709,175 granted on Jan. 20, 1998 to Carroll to use a radial flow fan disposed in a plenum connected to the engine enclosure and spaced from the side walls a pre-selected distance. In the '175 patent, Carroll teaches using an inlet duct in the engine enclosure to draw outside ambient air toward a radiator located within the engine enclosure. Further, the '175 patent teaches a shroud extending into the plenum to direct air flow passing through the radiator axially toward the radial flow fan and exhausting the air radially out through an opening at the top end of the plenum.

Accordingly, the art has sought an apparatus and method of cooling a work machine which: adequately cools the engine enclosure; draws sufficient ambient air across the radiator to cool the engine; reduces the noise emitted by the internal combustion system and the cooling system; insures that electrical and electronic parts, assemblies, components, and structures will not become overheated; and is more economical to manufacture and use.

The present invention is directed to overcoming one or more of the problems as set forth above.

DISCLOSURE OF THE INVENTION

In one aspect of the present invention, a work machine adapted to be controlled by an operator is provided. The work machine includes a frame, a plurality of ground engaging devices, an operator compartment, a work implement, an engine, and a work machine cooling system. The plurality of ground engaging devices support the frame and the operator compartment. The work implement is operably joined to the frame. The engine is operably coupled to the ground engaging devices. The cooling system includes a radiator, a rotating fan assembly, a rotating defector, a plurality of projections, and a means for rotating the fan and the deflector. The radiator is fluidically connected to the engine. The fan assembly includes a fan and is for drawing air in the first direction across the radiator. The deflector has a concave surface. The plurality of projections extend from the concave surface and are adapted to draw air in a second direction as the deflector is rotated.

In another aspect of the present invention, a cooling system for use with an engine is provided. The cooling system includes a radiator, a rotating fan assembly, a rotating deflector, a plurality of projections, a means for rotating the fan and the deflector, and an engine enclosure. The radiator is fluidically connected to the engine. The fan assembly includes a fan and is for drawing air in a first direction across the radiator. The deflector has a concave surface from which a plurality of projections extend and are adapted to draw air in a second direction as the deflector is rotated. The engine enclosure substantially surrounds the engine. The enclosure includes at least one inlet duct, an aperture having an edge, an exhaust stack connected to the edge, and a front wall having an opening therethrough. The exhaust port, exhaust stack, and aperture are disposed in alignment such that exhaust gases flow from the exhaust port through the exhaust stack such that air within the enclosure is drawn in a third direction through the exhaust stack with the exhaust gases.

In another aspect of the present invention, a method of cooling a work machine is provided. Air is drawn in a first direction across a radiator. Air is pumped in a second direction from the engine enclosure. The air leaving the radiator is deflected such that the air drawn in a first direction across the radiator and the air pumped in a second direction from the engine enclosure associates such that the air drawn in the first direction assists in drawing the air pumped in the second direction from the enclosure.

In another aspect of the present invention, a method of cooling a work machine is provided. A fan assembly is rotated. Air is drawn in a first direction across the radiator. Air from the fan is directed to an exhaust duct. A deflector is rotated. Air is drawn in a second direction from an engine enclosure through an opening in the front wall and out through the exhaust duct, such that the air passing from the fan to the exhaust duct assists in pumping air from within the enclosure out through the exhaust duct. Air is drawn within the enclosure in a third direction out through an exhaust stack.

These and other aspects and advantages of the present invention will become apparent to those skilled in the art upon reading the detailed description of the best mode for carrying out the invention in connection with the drawings and appended claims.

BRIEF DESCRIPTION OF THE DRAWINGS

For a better understanding of the invention, reference may be made to the accompanying drawings in which.

BEST MODE FOR CARRYING OUT THE INVENTION

Figure 1:
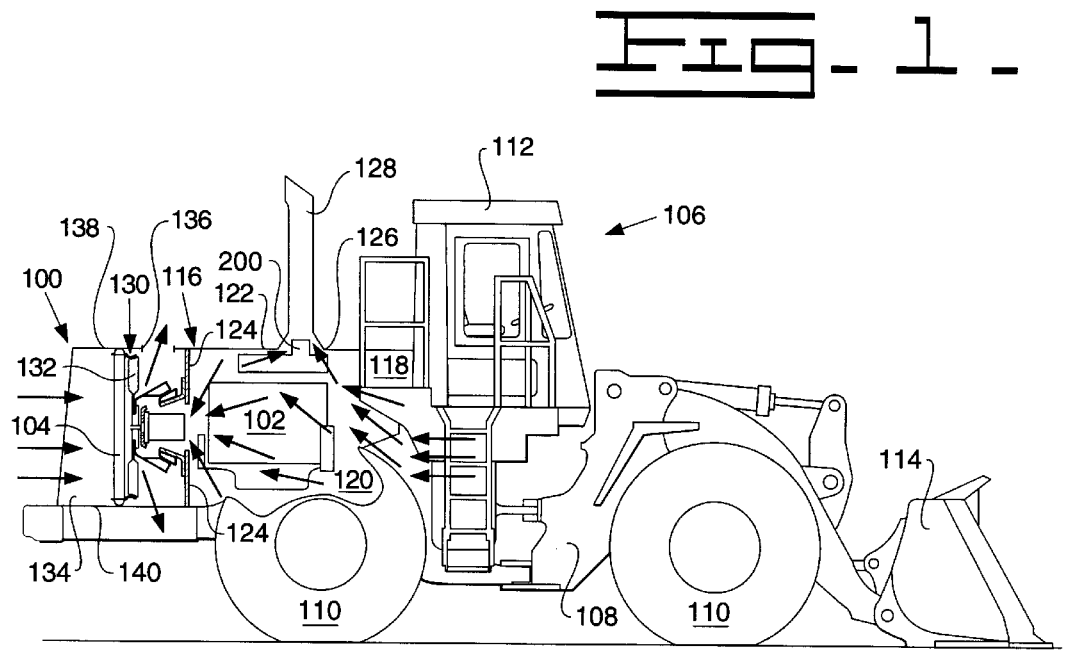
FIG. 1 is a cross sectional side view of a work machine according to one embodiment of the present invention.

A preferred embodiment of the present invention provides a method of cooling a work machine 106. A cooling system 100 for convection cooling of an internal combustion engine 102 having an associated radiator 104 is included. The cooling system 10 is particularly suitable for use in machine applications, such as earth working, paving, mining, and the like. This invention can be applied to several types of work machines 106, including track type loaders, mining shovels, wheel loaders, back hoe loaders, motor graders, track type tractors, compactors, wheeled tractors, pavers, excavators, material handlers, forestry machines, and the like.

The work machine 106 has a frame 108, a plurality of ground engaging devices 110, an operator compartment 112, a work implement 114, an engine 102, and a cooling system 100. The plurality of ground engaging devices 110 support the frame 108 and the operator compartment 112. The work implement 114 is operably joined to the frame 108 and is adapted to perform a work cycle. Preferably, the work implement 114 is joined to the frame through a linkage system.

The engine 102 is operably coupled to the ground engaging devices 110. Preferably, the engine 102 is coupled in such a manner that operation propels the work machine 106 across a grade.

Figure 2:
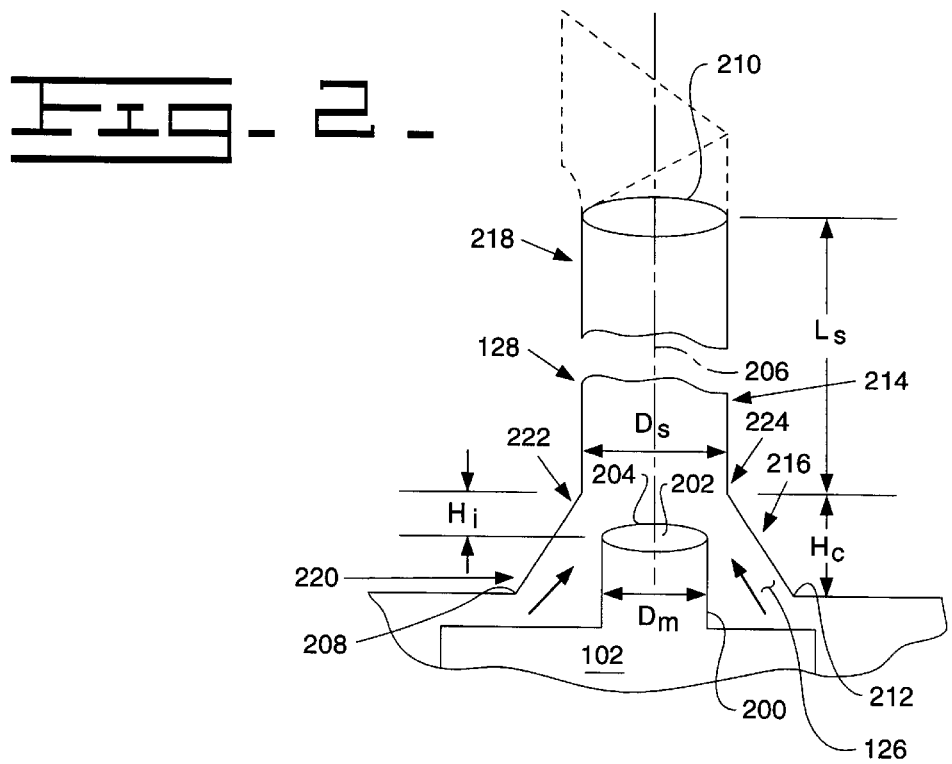
FIG. 2 is a cross sectional side view of the muffler and exhaust stack according to one embodiment of the present invention.

Referring now to FIG. 2, the engine 102 has an exhaust muffler 200. The exhaust muffler 200 includes an exhaust port 202. The exhaust port 202 includes a top periphery 204 and has a vertical axis 206 orthogonal to the top periphery 204 and a diameter (Dm).

Figure 3:
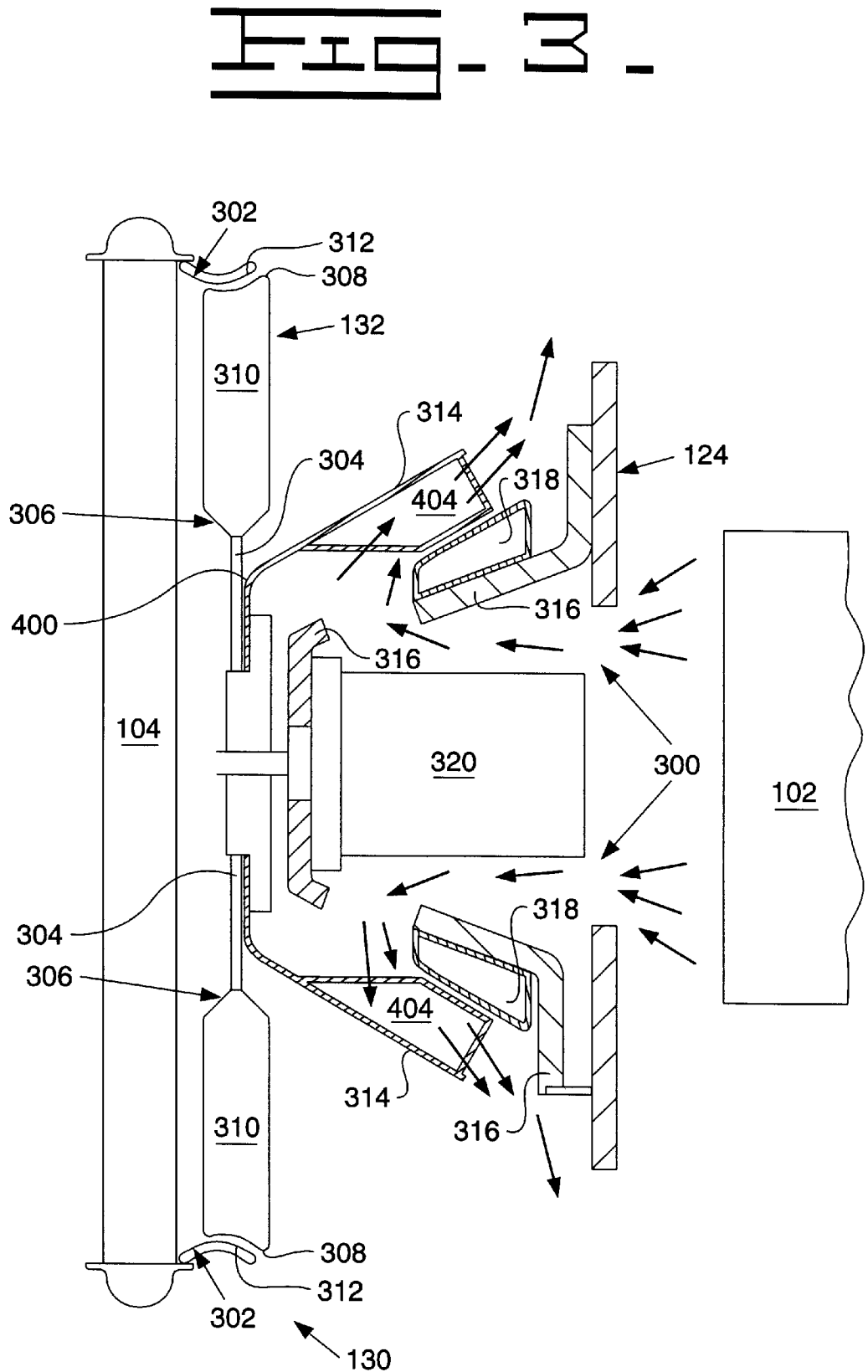
FIG. 3 is a cross sectional side view of the fan assembly, deflector, motor support assembly, front wall and related apparatus according to one embodiment of the present invention.

Referring back to FIG. 1, it is advantageous for the work machine 106 to include an engine enclosure 116 surrounding the engine 102 and connected to the frame 108. Preferably, the enclosure 116 includes at least one inlet duct 118, spaced apart opposed side walls 120, a top wall 122, a front wall 124, an aperture 126, and an exhaust stack 128. Referring now to FIG. 3, front wall 124 has an opening 300 through which air may pass.

Referring back to FIG. 2, the aperture 126 has an edge 208 and the exhaust stack 128 is connected to the edge 208. It is advantageous for the exhaust stack 128 to have a top circumference 210 and a bottom circumference 212. Further, it is advantageous for the exhaust stack 128 to have a cylindrical portion 214 and a tapered portion 216. The upper end 218 of the cylindrical portion 214 forms the top circumference 210. The cylindrical portion 214 has a diameter (Ds) and a length (Ls).

Preferably, the tapered portion 216 has a top end 222, bottom end 220, and a height (Hc). The bottom end 220 forms the bottom circumference 212. The top end 222 is connected to the lower end 224 of cylindrical portion 214. An inlet offset (Hi) is established as the distance along the vertical axis 206 from adjacent the top periphery 204 to adjacent the top circumference 210 less the length (Ls).

Advantageously, the exhaust port 202, exhaust stack 128, and aperture 126 are disposed in alignment such that as exhaust gases flow from the exhaust port 202 through the exhaust stack 128, air within the enclosure 116 is drawn through the exhaust stack 128 with the exhaust gases. This is understood to occur as a result of the warm air rising up through aperture 126 and exhaust stack 128, thereby creating a venturi effect. It is believed that in order to optimize the effect of drawing air within the enclosure 116 through the exhaust stack 128 with the exhaust gases that the relationship of the diameter (Ds) of the cylindrical portion to the diameter of the top periphery (Dm) should be defined by the following equation:

$$\frac{(Ds)^2}{(Dm)^2} > 2.$$

Similarly, it is believed that the relationship of the length (Ls) to the diameter (Ds) of the cylindrical portion should be defined by the following equation:

4<Ls/Ds<8.

Additionally, it is believed that the relationship of the diameter (Ds) of the cylindrical portion to the inlet offset (Hi) should be defined by the following equation:

$0.1Ds \leq Hi \leq 0.3Ds$.

Further, the relationship of the height (Hc) to the diameter (Ds) of the cylindrical portion should be defined by the following equation:

$0.5Ds \leq Hc \leq 1.0Ds$.

It should be appreciated that these values are a function of the dimensions of the structures involved and represent the preferred relationship, but those skilled in the art recognize that these may also depend on other factors related to the particular design and constraints of the work machine 106.

Referring back to FIG. 1, the cooling system 100 includes a radiator 104, a fan assembly 130, a deflector 400 (FIG. 4), and a means for rotating the fan 132 and the deflector 400.

The radiator 104 is fluidically connected to the engine 102. As is well known by those skilled in the art, heat transfer takes place between the radiator 104 and the air surrounding or flowing through the radiator 104. The radiator 104 typically contains coolant as is readily known by those skilled in the art. The coolant circulates between the engine 102 and the radiator 104 as is well understood in the art.

Referring now to FIG. 3, the fan assembly 130 draws air in a first direction across the radiator 104. The fan assembly 130 preferably includes a fan 132 and a first shroud 302. The fan 132 has a center core 304 and a plurality of radially extending blades 306 attached to the core 304. Advantageously, the blades 306 include a body 310 having a pre-established width, a leading edge, a trailing edge, and a tip 308. The first shroud 302 has a generally annular configuration with the inner surface establishing an internal perimeter 312. Advantageously, the first shroud 302 is connected adjacent the radiator 104 such that the tips 308 are disposed proximate the internal perimeter 312.

Referring back to FIG. 1, it is preferable for cooling system 100 to have a plenum 134. Plenum 134 has at least one exhaust duct 136, spaced apart opposing side walls (not shown), a top wall 138, and preferably a bottom wall 140. The plenum 134 is of a generally rectangular configuration and is positioned about the radiator 104 and adjacent the front wall 124.

Figure 4:
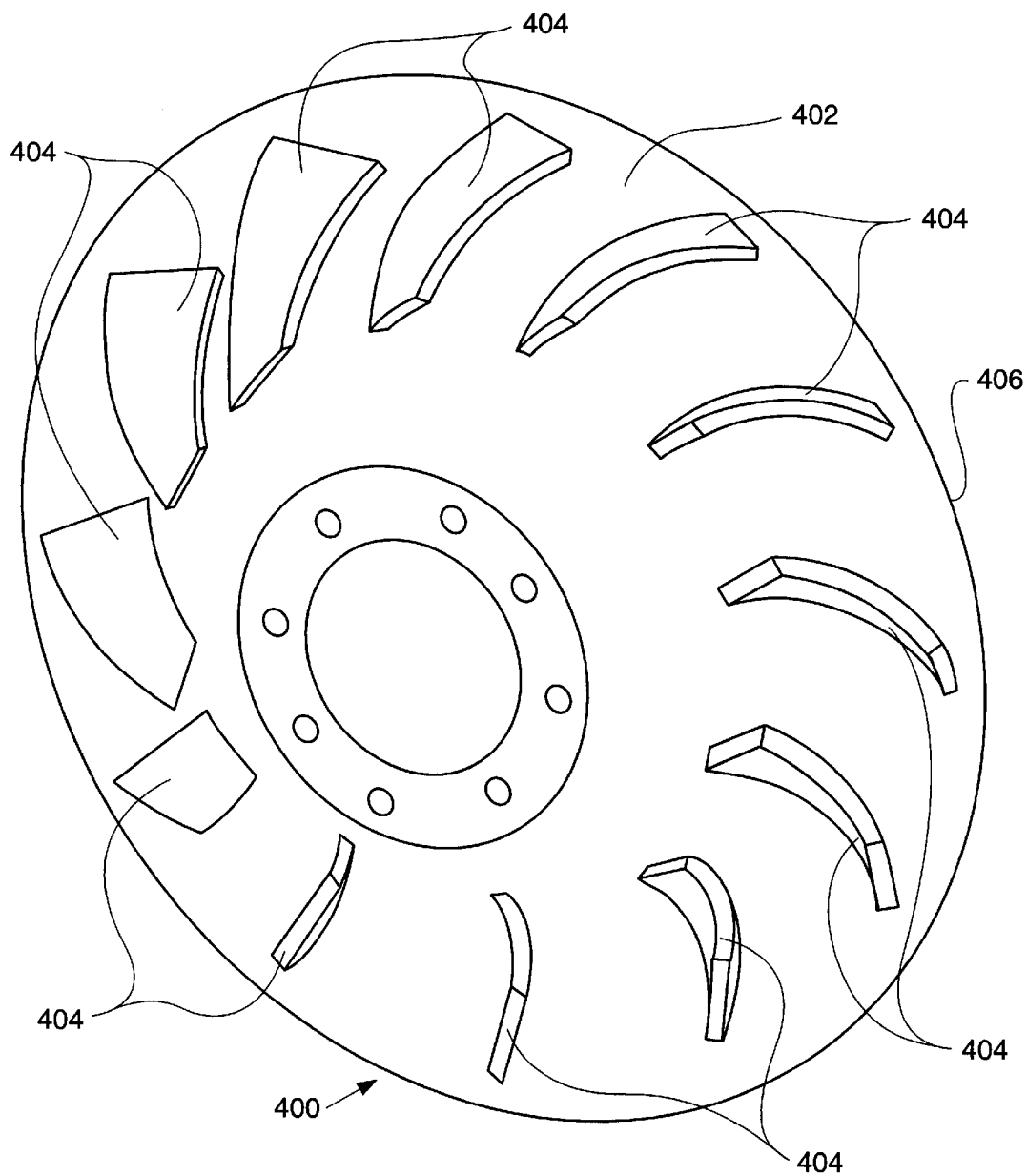
FIG. 4 is a perspective view of the concave surface of a deflector of the preferred embodiment of the present invention.

Referring now to FIG. 4, deflector 400 has a concave surface 402 and preferably a convex surface 314 (FIG. 3). The convex surface 314 is adapted to direct the air from the fan 132 to the exhaust duct 136 and is substantially opposite the concave surface 402. A plurality of projections extend from the concave surface 402 and are adapted to draw air in a second direction as the deflector 400 is rotated. Preferably, the plurality of projections are a plurality of arcuate fins 404.

Referring back to FIG. 3, it is advantageous for a motor support assembly 316 to be mounted to the front wall 124. In a preferred embodiment, a second shroud assembly 318 is disposed about the motor support assembly 316 and proximate the fins 404. The geometry of the second shroud assembly 318 is dependent upon the shape of the plurality projections extending from the concave surface of the deflector 400. As will be appreciated by those skilled in the art, the closer a shroud is to the fin (or blade in a fan assembly) the better the fin 404 can pump air. Therefore, it is desirable to design a shroud and a fin such that the contours of each are as close together as possible given machining tolerances and practical limitations like the effects of vibration and wear.

The means for rotating the fan 132 and the deflector 400 may be any such means 320 known in the art capable of performing such functions like an electric motor, a mechanical linkage or belt driven linkage from the engine 102, and the like or preferably a hydraulic motor. Preferably the means 320 is mounted to the motor support assembly 316 and is adapted to rotate the fan 132 and the deflector 400 in such a manner that the fan 132 causes air to be drawn in a first direction across the radiator 104 and out through the exhaust duct 136. Further, the rotation of the deflector 400 causes air to be drawn from the enclosure 116 through the opening 300 in the front wall 124 and pumped out through the exhaust duct 136. Advantageously, the air passing from the fan 132 along convex surface 314 to the exhaust duct 136 assists the fins 404 in pumping air from within the enclosure 116 out through the exhaust duct 136 by creating a venturi.

While aspects of the present invention have been particularly shown and described with reference to the preferred embodiment above, it will be understood by those skilled in the art that various additional embodiments may be contemplated without departing from the spirit and scope of the present invention. For example, various other combinations and permutations of various geometries could provide an apparatus or method for drawing air in more than one direction at a time, with or without a venturi affect, in order to cool and internal combustion system. However, a device or method for incorporating such an embodiment should be understood to fall within the scope of the present invention as determined based upon the appended claims and any equivalents thereof.

INDUSTRIAL APPLICABILITY

Sound treatment of the engine enclosure 116 reduces spectator sound power levels, but creates a problem of high underhood temperatures. These high temperatures negatively effect the life of engine components such as alternators, starters, belts, engine mounts, dampers, and the like.

In application, the cooling system 100 optimizes the use of existing inlet and outlet air passages, work machine structures, and existing apparatus to provide a work machine 106 having an adequately cooled internal combustion system including the engine enclosure 116 without the emission of unacceptable noise levels. This system provides a way to reduce the underhood temperatures by exhausting the high temperature air from inside the engine enclosure 116. Hot air is removed from the top of the engine 102 around the muffler 200 and turbo through the exhaust stack 128 while the deflector 400 pumps air from the region near the damper and belts at the front of the engine 102. Cool air is drawn in from behind the operator compartment 112 and through the hitch area. The result is significantly lower engine enclosure 116 temperatures with minimal consumption of engine 102 power.

In the preferred embodiment, a cooling system 100 takes advantage of the venturi effect in at least two portions of the system. One is about the exhaust muffler 200 in conjunction with the exhaust stack 128—which is one passageway that must be provided. The venturi uses the engine exhaust from the muffler 200 to create a low pressure zone in the inlet cone on the exhaust stack 128. The primary airflow (engine exhaust) draws the secondary flow (hot engine compartment air) into the exhaust stack 128 to be ejected. The dimensions and geometry of the stack 128 are determined by the exhaust port 202 size, vehicle constraints and several parameter relationships which are described herein.

Another location is along the outer boundary 406 of the deflector 400. For this to work, additional passages must be provided from the engine enclosure 116 through the front wall 124 to the plenum 134. Further, the projections or preferably the fins 404 act to increase the air flow from within the enclosure 116 into the plenum 134. Although new passages are provided and others may need to be enlarged to accomplish the described air flow through the front wall, the deflector 400 and fins 404 not only pump air from within the enclosure 116 out through exhaust duct 136, these also operate to muffle any sound passing through the additional or enlarged passages from the engine enclosure, thereby minimizing noise emissions.

The cooling system 100 uses a high cord angle fan 32 with tips 308 contoured to match the first shroud 302. A deflector 400 is mounted behind the fan blades 306 to help change the airflow from an axial direction to a radial flow. Cool air enters the radiator 104 from the rear of the machine 106. The fan 132 sucks air through the radiator 104 and then blows it out through outlets in the sides and top. In addition to the primary function of diverting the cooling system airflow from the fan 132, the deflector 400 is also equipped with fins 404. The purpose of these fins is to pump air from inside the engine enclosure 116 into the cooling system airstream.

The convex surface 314 guides the airflow and is determined by the location of the exit openings in the top and sides. A front wall 124 (sound wall) provides a barrier between the cooling system and the engine 102. An opening in the front wall 124 allows air to pass through, but the deflector 400 muffles the sound. Fins 404 are added to the deflector 400 to push the air out into the airstream created by the cooling system fan 132. A second shroud 318 is attached over the motor support assembly 316 to provide a surface for the fins 404 to work against.

Sound levels are maintained and underhood temperatures are reduced due to the airflow created by the venturi and the deflector 400 without the addition of mechanical drives.

The apparatus and method of certain embodiments of the present invention, when compared with other methods and apparatus, may have the advantages of adequately cooling the engine enclosure; drawing sufficient ambient air across the radiator to cool the engine; reducing the noise emitted by the internal combustion system and the cooling system; ensuring that electrical and electronic parts, assemblies, components, and structures will not become overheated; and being more economical to manufacture and use. Such advantages are particularly worthy of incorporating into the design, manufacture, and operation of work machines 106. In addition, the present invention may provide other advantages that have not been discovered yet.

It should be understood that while the preferred embodiment is described in connection with the work machine 106 having an implement 114, the present invention is readily adaptable to provide similar functions on other internal combustion systems. Other aspects, objects, and advantages of the present invention can be obtained from a study of the drawings, the disclosure, and the appended claims.

What is claimed is:
1. A work machine controlled by an operator, comprising:
   a frame;
   a plurality of ground engaging devices supporting the frame;
   an operator compartment supported by the ground engaging devices;
   a work implement operably joined to the frame and adapted to perform a work cycle; an engine operably coupled to the ground engaging devices; and
   a work machine cooling system, including:
      a radiator fluidically connected to the engine;
      a rotating fan assembly, including a fan for drawing air in a first direction across the radiator;
      a rotating deflector having a concave surface;
      a plurality of projections extending from the concave surface and adapted to draw air in a second direction as the deflector is rotated; and
      a means for rotating the fan and the deflector.
2. The work machine of claim 1, wherein the fan assembly has a first shroud being of a generally annular configuration and having in internal perimeter, the first shroud being connected adjacent the radiator.
3. The work machine of claim 1, wherein the fan assembly has a center core and a plurality of radially extending blades attached to the core, the blades including a body having a pre-established width, a leading edge, a trailing edge and a tip disposed proximate the internal perimeter.
4. The work machine of claim 1, wherein the fan assembly has a center core and a plurality of radially extending blades attached to the core, the blades including a body having a pre-established width, a leading edge, a trailing edge and a tip disposed proximate the internal perimeter; wherein the fan assembly has a first shroud being of a generally annular configuration and having in internal perimeter, the first shroud being connected adjacent the radiator; and wherein the internal perimeter of the first shroud has sides and a generally U-shaped convex geometry and the tips curve along the sides and extend beyond portions of the perimeter.
5. The work machine of claim 1, wherein the rotating deflector has a convex surface substantially opposite the concave surface and adapted to direct the air away from the fan.
6. The work machine of claim 1, wherein the plurality of projections are a plurality of arcuate fins.
7. The work machine of claim 6, including:
   an engine enclosure substantially surrounding the engine and connected to the frame, the enclosure having at least one inlet duct and spaced apart opposed side walls, a top wall, and a front wall having an opening therethrough;
   a plenum adjacent the engine enclosure front wall and having at least one exhaust duct, the plenum being of a generally rectangular configuration and positioned about the radiator;
   a motor support assembly mounted to the front wall; and
   a second shroud assembly disposed about the motor support assembly and proximate the fins, and wherein the means for rotating the fan and the deflector is a hydraulic motor mounted to the motor support assembly and adapted to rotate the fan and deflector such that the fan causes air to be drawn in a first direction across the radiator and out through the exhaust duct, the deflector causes air to be drawn from the enclosure through the opening in the front wall and pumped out through the exhaust duct, and the air passing from the fan to the exhaust duct assists the fins in pumping air from within the enclosure out through the exhaust duct.

8. The work machine of claim 1, wherein the engine has an exhaust muffler including an exhaust port and including an engine enclosure surrounding the engine and connected to the frame, the enclosure including at least one inlet duct, an aperture having an edge, an exhaust stack connected to the edge, and a front wall having an opening therethrough, the exhaust port, exhaust stack and aperture being disposed in alignment such that as exhaust gases flow from the exhaust port through the exhaust stack air within the enclosure is drawn through the exhaust stack with the exhaust gases.

9. The work machine of claim 8, wherein the exhaust port has a top periphery, a vertical axis orthogonal to the top periphery and a diameter (Dm); the exhaust stack has a top circumference, a bottom circumference attached to the edge, and a cylindrical portion, wherein the cylindrical portion forms the top circumference and has a diameter (Ds) and a length (Ls); and the relationship of the diameter (Ds) of the cylindrical portion to the diameter of the top periphery (Dm) is defined by the following equation:

$$\frac{(Ds)^2}{(Dm)^2} > 2; \text{ and}$$

the relationship of the length (Ls) to the diameter (Ds) of the cylindrical portion is defined by the following equation:

$$4 < Ls/Ds < 8.$$

10. The work machine of claim 9, wherein the cylindrical portion has a lower end and the exhaust stack has a tapered portion having a height (Hc), top end and a bottom end, the bottom end forming the bottom circumference and the top end being connected to the lower end; an inlet offset (Hi) is defined by the distance along the axis from adjacent the top periphery to adjacent the top circumference less the length (Ls); the relationship of the diameter (Ds) of the cylindrical portion to the inlet offset (Hi) is defined by the following equation:

$$0.1Ds \leq Hi \leq 0.3Ds;$$

and the relationship of the height (Hc) to the diameter (Ds) of the cylindrical portion is defined by the following equation:

$$0.5Ds \leq Hc \leq 1.0Ds.$$

11. A work machine controlled by an operator, comprising:
a frame;
a plurality of ground engaging devices supporting the frame;
an operator compartment supported by the ground engaging devices;
a work implement operably joined to the frame and adapted to perform a work cycle; an engine operably coupled to the ground engaging devices;
an engine enclosure surrounding the engine and connected to the frame, the enclosure having at least one inlet duct and spaced apart opposed side walls, a top wall, and a front wall having an opening therethrough; and
a work machine cooling system, including:
a radiator fluidically connected to the engine;
a plenum adjacent the engine enclosure front wall and having at least one exhaust duct and spaced apart opposing side walls, a top wall, and a bottom wall, the plenum being of a generally rectangular configuration and being positioned about the radiator;
a rotating fan assembly for drawing air in a first direction across the radiator, the fan assembly including a fan having a center core and a plurality of radially extending blades attached to the core and a first shroud, the blades including a body having a pre-established width, a leading edge, a trailing edge and a tip, the first shroud being of a generally annular configuration and having in internal perimeter, the first shroud being connected adjacent the radiator such that the tips are disposed proximate the internal perimeter;
a rotating deflector having a convex surface adapted to direct the air from the fan to the exhaust duct and a concave surface substantially opposite the convex surface;
a plurality of arcuate fins extending from the concave surface and adapted to draw air from the enclosure through the opening in the front wall as the deflector is rotated;
a motor support assembly mounted to the front wall;
a second shroud assembly disposed about the motor support assembly and proximate the fins; and
a hydraulic motor mounted to the motor support assembly and adapted to rotate the fan and deflector such that the fan causes air to be drawn in a first direction across the radiator and out through the exhaust duct, the deflector causes air to be drawn from the enclosure through the opening in the front wall and pumped out through the exhaust duct, and the air passing from the fan to the exhaust duct assists the fins in pumping air from within the enclosure out through the exhaust duct.

12. The work machine of claim 11, wherein the engine has an exhaust muffler including an exhaust port and wherein the engine enclosure includes an aperture having an edge and an exhaust stack connected to the edge, the exhaust port, exhaust stack and aperture being disposed in alignment such that as exhaust gases flow from the exhaust port through the exhaust stack air within the enclosure is drawn through the exhaust stack with the exhaust gases.

13. The work machine of claim 12, wherein the exhaust port has a top periphery, a vertical axis orthogonal to the top periphery and a diameter (Dm); the exhaust stack has a top circumference, a bottom circumference attached to the edge, and a cylindrical portion wherein the cylindrical portion forms the top circumference and has a diameter (Ds) and a length (Ls); and
the relationship of the diameter (Ds) of the cylindrical portion to the diameter of the top periphery (Dm) is defined by the following equation:

$$\frac{(Ds)^2}{(Dm)^2} > 2; \text{ and}$$

the relationship of the length (Ls) to the diameter (Ds) of the cylindrical portion is defined by the following equation:

$$4 < Ls/Ds < 8.$$

14. The work machine of claim 13, wherein the cylindrical portion has a lower end and the exhaust stack has a tapered portion having a height (Hc), top end and a bottom end, the bottom end forming the bottom circumference and the top end being connected to the lower end; an inlet offset (Hi) is defined by the distance along the axis from adjacent the top periphery to adjacent the top circumference less the length (Ls); the relationship of the diameter (Ds) of the cylindrical portion to the inlet offset (Hi) is defined by the following equation:

$$0.1Ds \leq Hi \leq 0.3Ds;$$

and the relationship of the height (Hc) to the diameter (Ds) of the cylindrical portion is defined by the following equation:

$$0.5Ds \leq Hc \leq 1.0Ds.$$

15. A work machine controlled by an operator, comprising:
    a frame;
    a plurality of ground engaging devices supporting the frame;
    an operator compartment supported by the ground engaging devices;
    a work implement operably joined to the frame and adapted to perform a work cycle; an engine having an exhaust muffler including an exhaust port, the engine being operably coupled to the ground engaging devices;
    an engine enclosure surrounding the engine and connected to the frame, the enclosure including at least one inlet duct, an aperture having an edge, an exhaust stack connected to the edge, and a front wall having an opening therethrough, the exhaust port, exhaust stack and aperture being disposed in alignment such that as exhaust gases flow from the exhaust port through the exhaust stack air within the enclosure is drawn through the exhaust stack with the exhaust gases; and
    a work machine cooling system, including:
        a radiator fluidically connected to the engine;
        a rotating fan assembly including a fan and for drawing air in a first direction across the radiator;
        a rotating deflector having a concave surface;
        a plurality of projections extending from the concave surface and adapted to draw air in a second direction as the deflector is rotated; and a means for rotating the fan and the deflector.

16. The work machine of claim 15, wherein the fan assembly has a first shroud being of a generally annular configuration and having in internal perimeter, the first shroud being connected adjacent the radiator.

17. The work machine of claim 15, wherein the fan assembly has a center core and a plurality of radially extending blades attached to the core, the blades including a body having a pre-established width, a leading edge, a trailing edge and a tip disposed proximate the internal perimeter.

18. The work machine of claim 15, wherein the fan assembly has a center core and a plurality of radially extending blades attached to the core, the blades including a body having a pre-established width, a leading edge, a trailing edge and a tip disposed proximate the internal perimeter; wherein the fan assembly has a first shroud being of a generally annular configuration and having in internal perimeter, the first shroud being connected adjacent the radiator; and wherein the internal perimeter of the first shroud has sides and a generally U-shaped convex geometry and the tips curve along the sides and extend beyond portions of the perimeter.

19. The work machine of claim 15, wherein the rotating deflector has a convex surface substantially opposite the concave surface and adapted to direct the air away from the fan.

20. The work machine of claim 15, wherein the plurality of projections are a plurality of arcuate fins.

21. The work machine of claim 20, including:
    a plenum adjacent the engine enclosure front wall and having at least one exhaust duct, the plenum being of a generally rectangular configuration and positioned about the radiator;
    a motor support assembly mounted to the front wall; and
    a second shroud assembly disposed about the motor support assembly and proximate the fins, and wherein the means for rotating the fan and the deflector is a hydraulic motor mounted to the motor support assembly and adapted to rotate the fan and deflector such that the fan causes air to be drawn in a first direction across the radiator and out through the exhaust duct, the deflector causes air to be drawn from the enclosure through the opening in the front wall and pumped out through the exhaust duct, and the air passing from the fan to the exhaust duct assists the fins in pumping air from within the enclosure out through the exhaust duct.

22. The work machine of claim 15, wherein the exhaust port has a top periphery, a vertical axis orthogonal to the top periphery and a diameter (Dm); the exhaust stack has a top circumference, a bottom circumference attached to the edge and a cylindrical portion, wherein the cylindrical portion forms the top circumference and has a diameter (Ds) and a length (Ls); and the relationship of the diameter (Ds) of the cylindrical portion to the diameter of the top periphery (Dm) is defined by the following equation:

$$\frac{(Ds)^2}{(Dm)^2} > 2; \text{ and}$$

the relationship of the length (Ls) to the diameter (Ds) of the cylindrical portion is defined by the following equation:

$$4 < Ls/Ds < 8.$$

23. The work machine of claim 22, wherein the cylindrical portion has a lower end and the exhaust stack has a tapered portion having a height (Hc), top end and a bottom end, the bottom end forming the bottom circumference and the top end being connected to the lower end; an inlet offset (Hi) is defined by the distance along the axis from adjacent the top periphery to adjacent the top circumference less the length (Ls); the relationship of the diameter (Ds) of the cylindrical portion to the inlet offset (Hi) is defined by the following equation:

$$0.1Ds \leq Hi \leq 0.3Ds;$$

and the relationship of the height (Hc) to the diameter (Ds) of the cylindrical portion is defined by the following equation:

$$0.5Ds \leq Hc \leq 1.0Ds.$$

24. A work machine controlled by an operator, comprising:
    a frame;
    a plurality of ground engaging devices supporting the frame;

an operator compartment supported by the ground engaging devices;

a work implement operably joined to the frame and adapted to perform a work cycle; an engine having an exhaust muffler including an exhaust port, the engine being operably coupled to the ground engaging devices;

an engine enclosure surrounding the engine and connected to the frame, the enclosure including at least one inlet duct, spaced apart opposed side walls, a top wall, and a front wall having an opening therethrough, an aperture having an edge, and an exhaust stack connected to the edge, the exhaust port, exhaust stack and aperture being disposed in alignment such that as exhaust gases flow from the exhaust port through the exhaust stack air within the enclosure is drawn through the exhaust stack with the exhaust gases; and a work machine cooling system, including:
  a radiator fluidically connected to the engine;
  a plenum adjacent the engine enclosure front wall and having at least one exhaust duct and spaced apart opposing side walls, a top wall, and a bottom wall, the plenum being of a generally rectangular configuration and being positioned about the radiator;
  a rotating fan assembly for drawing air in a first direction across the radiator, the fan assembly including a fan having a center core and a plurality of radially extending blades attached to the core and a first shroud, the blades including a body having a pre-established width, a leading edge, a trailing edge and a tip, the first shroud being of a generally annular configuration and having in internal perimeter, the first shroud being connected adjacent the radiator such that the tips are disposed proximate the internal perimeter;
  a rotating deflector having a convex surface adapted to direct the air from the fan to the exhaust duct and a concave surface substantially opposite the convex surface;
  a plurality of arcuate fins extending from the concave surface and adapted to draw air from the enclosure through the opening in the front wall as the deflector is rotated;
  a motor support assembly mounted to the front wall;
  a second shroud assembly disposed about the motor support assembly and proximate the fins; and
  a hydraulic motor mounted to the motor support assembly and adapted to rotate the fan and deflector such that the fan causes air to be drawn in a first direction across the radiator and out through the exhaust duct, the deflector causes air to be drawn from the enclosure through the opening in the front wall and pumped out through the exhaust duct, and the air passing from the fan to the exhaust duct assists the fins in pumping air from within the enclosure out through the exhaust duct.

25. The work machine of claim 24, wherein the exhaust port has a top periphery, a vertical axis orthogonal to the top periphery and a diameter (Dm); the exhaust stack has a top circumference, a bottom circumference attached to the edge, and a cylindrical portion wherein the cylindrical portion forms the top circumference and having a diameter (Ds) and a length (Ls); and the relationship of the diameter (Ds) of the cylindrical portion to the diameter of the top periphery (Dm) is defined by the following equation:

$$\frac{(Ds)^2}{(Dm)^2} > 2; \text{ and}$$

the relationship of the length (Ls) to the diameter (Ds) of the cylindrical portion is defined by the following equation:

$$4 < Ls/Ds < 8.$$

26. The work machine of claim 25, wherein the cylindrical portion has a lower end and the exhaust stack has a tapered portion having a height (Hc), top end and a bottom end, the bottom end forming the bottom circumference and the top end being connected to the lower end; an inlet offset (Hi) is defined by the distance along the axis from adjacent the top periphery to adjacent the top circumference less the length (Ls); the relationship of the diameter (Ds) of the cylindrical portion to the inlet offset (Hi) is defined by the following equation:

$$0.1Ds \leq Hi \leq 0.3Ds;$$

and the relationship of the height (Hc) to the diameter (Ds) of the cylindrical portion is defined by the following equation:

$$0.5Ds \leq Hc \leq 1.0Ds.$$

27. A cooling system for use with an engine having an exhaust muffler including an exhaust port, comprising:
  a radiator fluidically connected to the engine;
  a rotating fan assembly including a fan and for drawing air in a first direction across the radiator;
  a rotating deflector having a concave surface;
  a plurality of projections extending from the concave surface and adapted to draw air in a second direction as the deflector is rotated; a means for rotating the fan and the deflector; and
  an engine enclosure substantially surrounding the engine, the enclosure including at least one inlet duct, an aperture having an edge, an exhaust stack connected to the edge, and a front wall having an opening therethrough, the exhaust port, exhaust stack and aperture being disposed in alignment such that as exhaust gases flow from the exhaust port through the exhaust stack that air within the enclosure is drawn in a third direction through the exhaust stack with the exhaust gases.

28. A method of cooling a work machine controlled by an operator, comprising the steps of:
  rotating a fan assembly;
  drawing air in a first direction across a radiator;
  directing the air from the fan to an exhaust duct;
  rotating a deflector;
  drawing air in a second direction and from an engine enclosure through an opening in the front wall and out through the exhaust duct, such that the air passing from the fan to the exhaust duct assists in pumping air from within the enclosure out through the exhaust duct; and
  drawing air within the enclosure in a third direction out through an exhaust stack.

* * * * *